(12) United States Patent
Cunningham

(10) Patent No.: US 7,063,181 B1
(45) Date of Patent: Jun. 20, 2006

(54) FLUID-BORNE NOISE SUPPRESSION IN AN AUTOMOTIVE POWER STEERING SYSTEM

(75) Inventor: Gail M. Cunningham, Oxford, MI (US)

(73) Assignee: Dana Corporation, Ottawa Lake, MI (US)

( * ) Notice: Subject to any disclaimer, the term of this patent is extended or adjusted under 35 U.S.C. 154(b) by 1217 days.

(21) Appl. No.: 09/841,518

(22) Filed: Apr. 24, 2001

Related U.S. Application Data

(60) Provisional application No. 60/200,122, filed on Apr. 27, 2000.

(51) Int. Cl.
  *F16K 47/02* (2006.01)
  *F16L 55/04* (2006.01)
  *F16L 9/18* (2006.01)
  *F16L 11/26* (2006.01)

(52) U.S. Cl. .................. 181/233; 138/113; 138/114; 138/126

(58) Field of Classification Search ............... 181/233, 181/248; 138/112–114, 126, 137, 153
See application file for complete search history.

(56) References Cited

U.S. PATENT DOCUMENTS

| | | | | |
|---|---|---|---|---|
| 3,599,677 A | 8/1971 | O'Brien | ................ | 138/122 |
| 3,605,818 A | 9/1971 | Balchan | ................ | 138/126 |
| 3,948,293 A | 4/1976 | Bixby | ................ | 138/126 |
| 4,035,534 A | 7/1977 | Nyberg | ................ | 428/26 |
| 4,089,360 A | 5/1978 | Böhm | ................ | 152/330 R |
| 4,196,754 A | 4/1980 | Payne | ................ | 138/137 |
| 4,287,217 A | 9/1981 | Hammer et al. | ................ | 426/105 |
| 4,322,260 A | 3/1982 | Conlon | ................ | 156/244.12 |
| 4,457,799 A | 7/1984 | Dunn | ................ | 156/307.1 |
| 4,559,095 A | 12/1985 | Babbin | ................ | 156/244.13 |
| 4,603,712 A | 8/1986 | Krause | ................ | 138/137 |
| 4,633,912 A | 1/1987 | Pilkington et al. | ................ | 138/132 |
| 4,657,285 A | 4/1987 | Akiyama et al. | ................ | 285/256 |
| 4,688,605 A | 8/1987 | Eisenzimmer et al. | ................ | 138/130 |
| 4,734,305 A | 3/1988 | Sugimoto et al. | ................ | 428/36 |
| 4,802,938 A * | 2/1989 | Kitami et al. | ................ | 156/149 |
| 4,870,995 A | 10/1989 | Igarashi et al. | ................ | 138/126 |
| 4,881,576 A * | 11/1989 | Kitami et al. | ................ | 138/125 |
| 4,984,604 A * | 1/1991 | Nishimura | ................ | 138/126 |
| 4,992,314 A * | 2/1991 | Saitoh | ................ | 428/36.3 |
| 4,998,565 A | 3/1991 | Kokuryu et al. | ................ | 138/126 |
| 5,093,426 A | 3/1992 | Sakabe et al. | ................ | 525/223 |
| 5,156,699 A * | 10/1992 | Nakano et al. | ................ | 156/149 |
| 5,158,113 A * | 10/1992 | Ozawa et al. | ................ | 138/137 |
| 5,171,787 A | 12/1992 | Zama et al. | ................ | 525/105 |
| 5,172,729 A | 12/1992 | Vantellini | ................ | 138/26 |
| 5,201,343 A | 4/1993 | Zimmermann et al. | ................ | 138/26 |

(Continued)

*Primary Examiner*—Edgardo San Martin
(74) *Attorney, Agent, or Firm*—Reising, Ethington, Barnes, Kisselle, P.C.

(57) ABSTRACT

A method of dampening fluid-borne noise in an automotive power steering system in accordance with a presently preferred embodiment of the invention contemplates provision of a power steering fluid hose having a laminated inner tube surrounded by a reinforcing outer tube. The inner tube has a resilient inner layer with a radial thickness $T_1$ and a resilient outer layer with a radial thickness $T_2$. The inner layer is softer than the outer layer and is bonded by vulcanization to the outer layer. The radial thicknesses $T_1$ and $T_2$ have a ratio selected to dampen fluid-borne noise within a preselected frequency range by elastic expansion of the inner and outer layers.

7 Claims, 3 Drawing Sheets

U.S. PATENT DOCUMENTS

| | | | |
|---|---|---|---|
| 5,316,046 A | 5/1994 | Igarashi et al. | 138/126 |
| 5,376,730 A | 12/1994 | Niwano et al. | 525/329.3 |
| 5,462,091 A * | 10/1995 | Saupe | 138/126 |
| 5,488,974 A * | 2/1996 | Shiota et al. | 138/125 |
| 5,521,340 A | 5/1996 | Thawani et al. | 181/233 |
| 5,679,425 A * | 10/1997 | Plumley | 428/35.7 |
| 5,937,911 A * | 8/1999 | Kodama et al. | 138/137 |
| 5,957,164 A * | 9/1999 | Campbell | 138/137 |
| 6,071,579 A * | 6/2000 | Green et al. | 428/36.3 |
| 6,155,378 A | 12/2000 | Qatu et al. | 181/255 |

* cited by examiner

FLUID-BORNE NOISE SUPPRESSION IN AN AUTOMOTIVE POWER STEERING SYSTEM

This application claims priority from Provisional Application Ser. No. 60/200,122 filed Apr. 27, 2000

The present invention is directed to suppression of fluid-borne noise in an automotive power steering system, and more particularly to a power steering pressure hose and method of manufacture having improved fluid-borne noise dampening characteristics.

BACKGROUND OF THE INVENTION

Present day automobile power steering systems use power steering hoses that are constructed and/or provided with acoustic chambers and the like so as to, in varying degrees, dampen noise generated by the power steering pump and/or steering gear. The prior art is replete with a relatively long history of disclosures that describe devices incorporated inside the power steering hose or connected in line with the power steering hoses to dampen this noise. See for example U.S. Pat. Nos. 5,521,340 and 5,172,729 and earlier patents cited as references therein. However, as to improvements in the construction of the power steering hose itself, the emphasis has been in the direction of developing improved heat resistance, which in turn should result in longer service life in the adverse automotive engine compartment environment. To achieve this, higher temperature materials such as chlorosulfonated polyethylene and hydrogenated nitrile have been used.

The power steering hose constructions usually consist of an annular laminate made up of a multiplicity of concentric tubular members, such as an innermost tube, a tubular reinforcement layer, a tubular friction layer, a second tubular reinforcement layer and a tubular outside cover layer. In some instances, the innermost tube of the hose itself is made up of two separate layers. These layers may be coextruded to provide a high temperature innermost material that would come in contact with the power steering fluid, backed up by a lower cost surrounding material to provide the necessary tube strength. See in this regard the U.S. Pat. No. 5,316,046, issued May 31, 1994. See also U.S. Pat. No. 4,998,565 and the prior art cited in the aforementioned '046 patent.

SUMMARY OF THE INVENTION

In general, and by way of summary description and not by way of limitation, the present invention achieves the aforestated, as well as one or more additional objects set forth hereinafter, by providing a power steering hose construction that has improved noise dampening properties achieved by using a material for the innermost tube of the multilayer inner tube of the hose construction that has improved noise dampening properties, such as an ethylene/acrylic elastomer, without scarificing the resistance of the hose construction to high temperature fluid. This innermost tube preferably is bonded through vulcanization to a surrounding tube of material that possesses lesser noise dampening characteristics but provides other desirable physical characteristics in the composite hose construction. The dampening characteristics of the hose can be varied by varying the relationship of the radial wall thicknesses, relative to one another, of the inner and outer tubes of the multilayer innermost tube of the hose.

A method of dampening fluid-borne noise in an automotive power steering system in accordance with a presently preferred embodiment of the invention contemplates provision of a power steering fluid hose having a laminated inner tube surrounded by a reinforcing outer tube. The inner tube has a resilient inner layer with a radial thickness $T_1$ and a resilient outer layer with a radial thickness $T_2$. The inner layer is softer than the outer layer and is bonded by vulcanization to the outer layer. The radial thicknesses $T_1$ and $T_2$ have a ratio selected to dampen fluid-borne noise within a preselected frequency range by elastic expansion of the inner and outer layers.

BRIEF DESCRIPTION OF THE DRAWINGS

The foregoing as well as additional objects, features and advantages of the present invention will become apparent from the following detailed description of the present invention taken in conjunction with the accompanying drawing wherein.

DETAILED DESCRIPTION OF THE PREFERRED EMBODIMENTS

Figure 1:
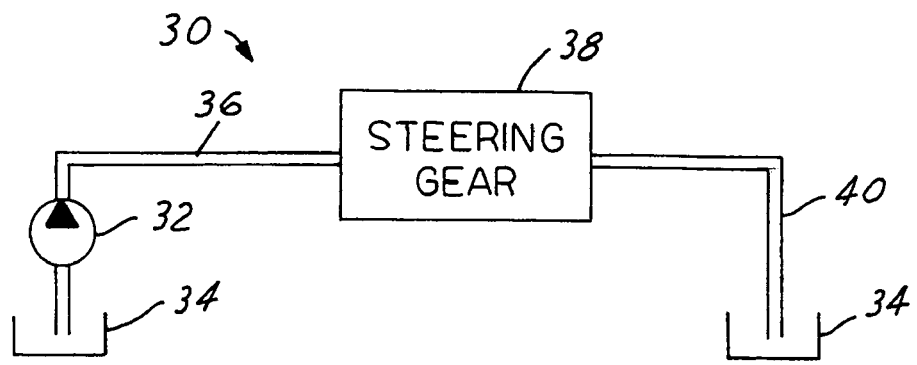
FIG. 1 is a schematic diagram of an automotive power steering system equipped with a power steering pressure hose in accordance with the present invention.

FIG. 1 is a schematic diagram of an automotive power steering system 30. A pump 32 draws fluid from a sump 34 and delivers the fluid under pressure through a conduit 36 to a steering gear 38. From steering gear 38, the fluid is returned to sump 34 by a conduit 40.

Figure 2:
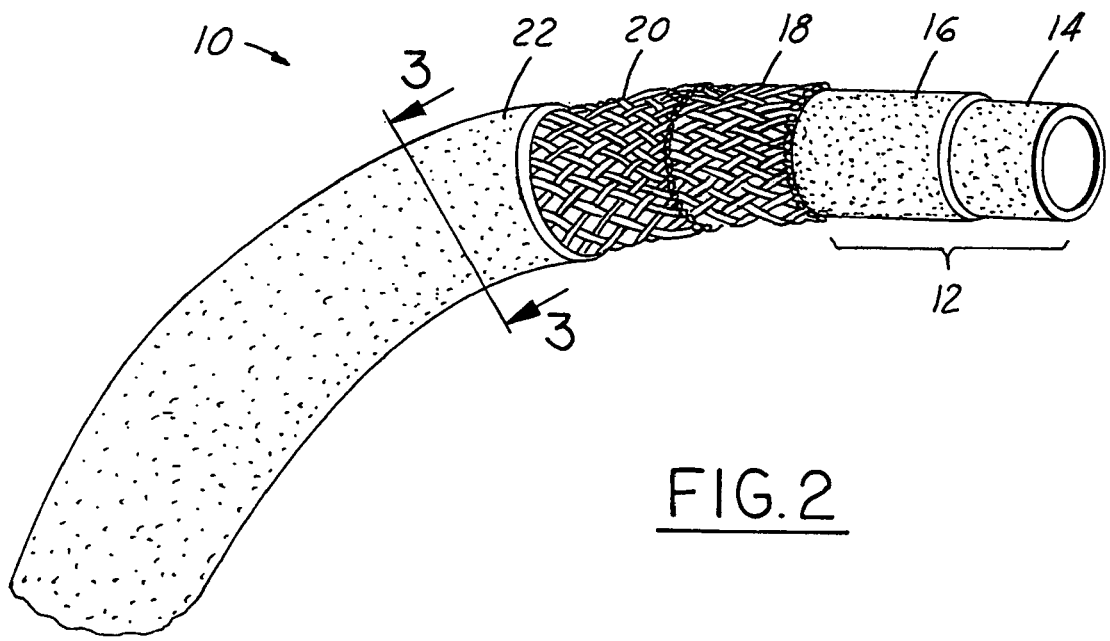
FIG. 2 is a fragmentary perspective view of a power steering hose construction embodying the hose construction features of the invention to provide improved noise dampening properties.
Figure 3:
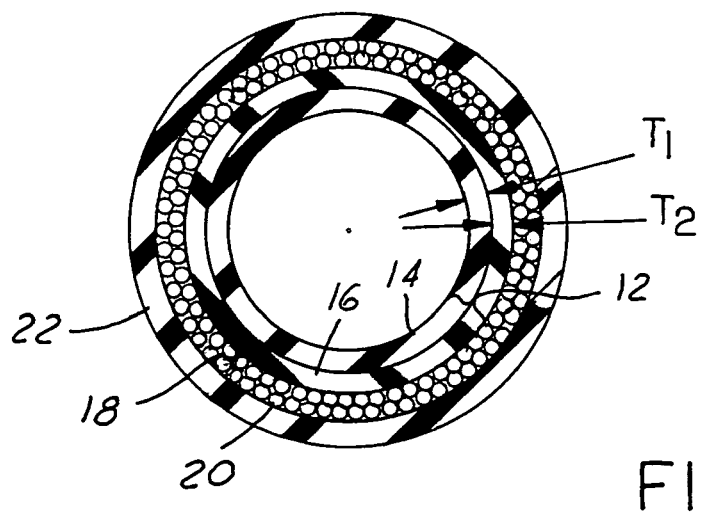
FIG. 3 is a cross sectional view taken on the line 2—2 of FIG. 1 but not to scale.

Referring now to FIGS. 2 and 3 of the drawing, there is shown a power steering hose 10 constructed as an exemplary but presently preferred embodiment of the invention to serve as an improved conduit 36 and/or 40 (FIG. 1) for power steering fluid in automotive power steering system 30. Hose 10 includes multilayered inner tube 12 made up of an inner tubular layer 14 and an outer tubular layer 16, two concentric tubular braided reinforcement layers 18 and 20, and an outer tubular cover 22. If desired, an insulation rubber layer (not shown) may be disposed between the reinforcement layers 18 and 20, as illustrated in aforementioned U.S. Pat. No. 5,316,046 (incorporated herein by reference). As best seen in the cross sectional view of FIG. 3, the wall thickness of inner layer 14 of tube 12 taken radially of the same is designated "$T_1$". Likewise, the wall thickness of the outer layer 16 of the multilayer inner tube 12 taken radially of the same is designated "$T_2$".

Instead of (or in addition to) attempting to provide sound deadening devices incorporated inside the hose or connected in line with the power steering hoses to dampen system noise generated by the power steering pump and/or steering gear, the present invention achieves noise dampening in the power steering hose by using a material for inner layer 14 of the multilayer tube 12 that has good noise dampening properties, such as an ethylene/acrylic elastomer, but without sacrificing the resistance of the hose construction to high temperature power steering fluid. Thus inner tube layer 14 is bonded through vulcanization to a surrounding material (described in more detail hereafter) used in the construction of the outer layer 16 of tube 12, which possesses lessor noise dampening characteristics but that can withstand high temperatures and thereby provides hoop strength reinforcement under such adverse temperature conditions.

In addition, the invention contemplates varying the noise dampening ability of hose 10 by adjusting the thickness $T_1$ of the inner layer 14 of tube 12 in relation to the thickness $T_2$ of the outer layer 16 of tube 12. The multilayer tube 12 may be made by a coextrusion process and apparatus such as that disclosed in U.S. Pat. No. 4,322,260 incorporated herein by reference. This multilayer inner core 12 may then be covered with the tubular reinforcement layers 18 and 20 in the form of a braid or spiral or woven material to provide reinforcement. The hose noise dampening ability can be enhanced further by using a reinforcement yarn in layers 18 and 20 such as nylon applied in such a manner as to allow for expansion of the hose under pressure. The expansion of the hose can be controlled through the amount of elongation of the yarn and the angle at which it is applied. See, for example, U.S. Pat. No. 4,633,912 also incorporated herein by reference.

The hardness of the inner layer 14 of the multilayer inner tube 12 is preferably in approximately the range of 70–80 durometer. A durometer value below 70 may be too soft to obtain an adequate seal, whereas a durometer value above 80 renders it more difficult to manufacture the extruded layer and provides less noise dampening properties.

Outer layer 16 of inner tube 12 is preferably made of a peroxide-vulcanized acrylonitrile-butadiene copolymer rubber (NBR) that provides strength and high temperature resistance to the multilayer tube 12. Layers 14 and 16 of the multilayer tube 12 preferably are coextruded and bonded together through vulcanization after coextrusion. The two layers of braided material 18 and 20 provide hoop strength to the overall hose construction to achieve a burst pressure on the order of 8,000 to 10,000 psi and are preferably made of suitable synthetic fibers such as high elongation nylon. Outer cover 22 is preferably made of chlorinated polyethylene (CPE).

The ratio of the thickness $T_1$ of the inner layer 14 to the thickness $T_2$ of the outer layer 16 of the multilayer tube 12 preferably is selected at an empirically determined value in view of the desired noise dampening characteristics of hose 10 and the inside diameter of the multilayer inner tube 12. This empirical determination may be made by physical experimentation and/or analytical computer modeling. Hence, it is necessary that the minimum thickness for inner layer 14 be empirically determined to provide sufficient heat resistance and oil resistance, and more importantly the desired noise dampening characteristics. On the other hand, the outer layer 16 would have an empirically determined minimum thickness that would ensure sufficient adhesion to the inner layer 14 and to the reinforcement layer 18.

The ratio of $T_1:T_2$ is preferably approximately in the range of 30:70 to 70:30, with a preferred example being a mid-range ratio of 50:50. In any event the ratio can be further optimized and tuned to the particular vehicle power system to maximize noise dampening under the parameters of operation of a particular vehicle system.

Figure 4:
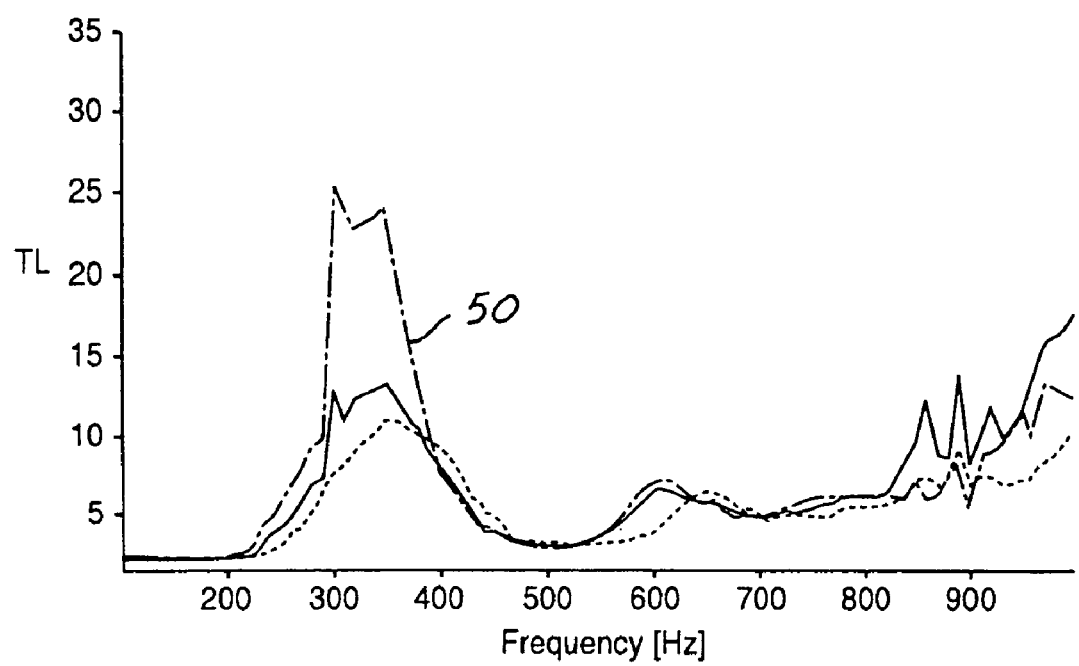
FIGS. 4–6 are graphs that illustrate test results in accordance with a presently preferred embodiment of the invention.
Figure 5:
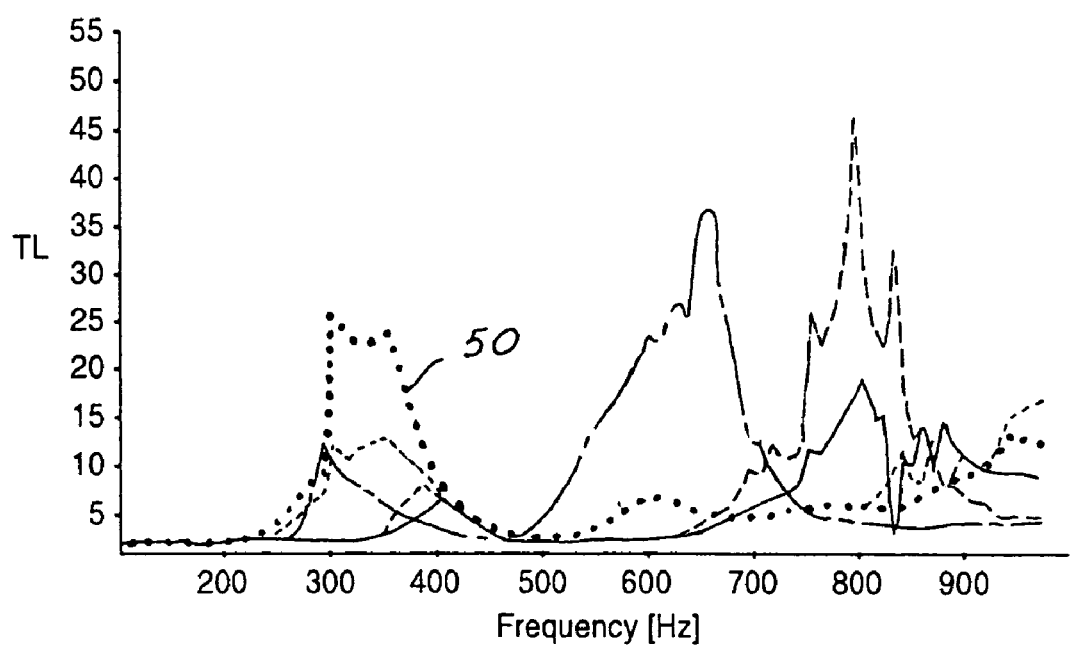
Figure 6:
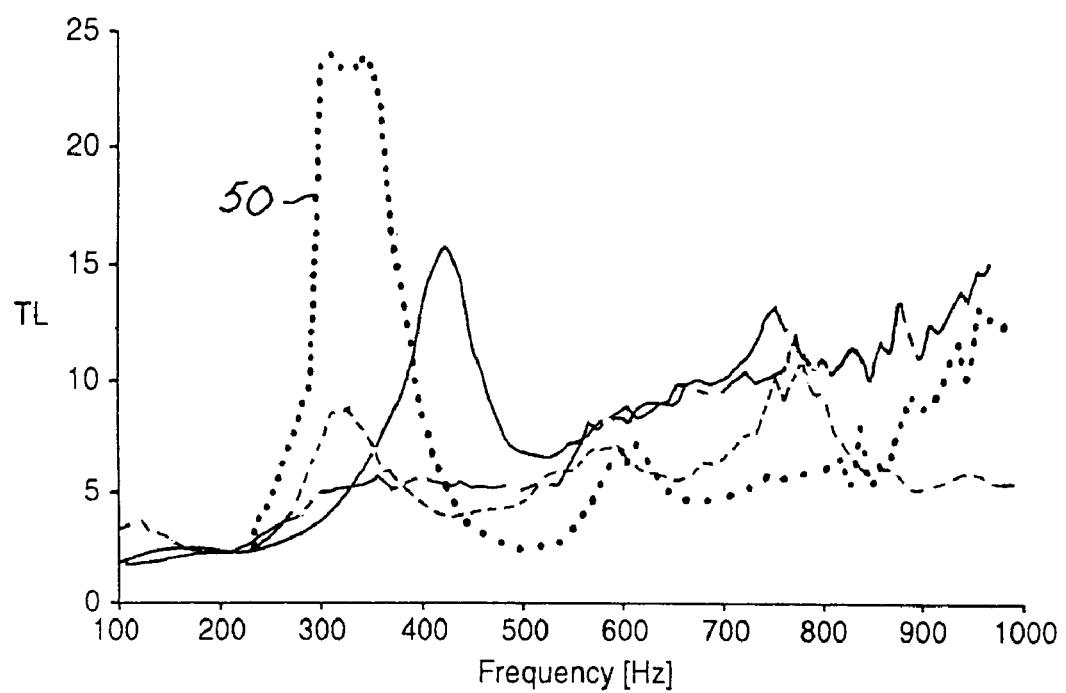

FIGS. 4–6 are graphs that illustrate results of testing an automotive power steering hose in accordance with the present invention in comparison with currently available hoses for power steering applications. All hoses were 400 mm in length, and were tested in accordance with ISO 10767-1. Each graph of FIGS. 4–6 illustrate transmission loss TL (no units) as a function of frequency. The higher the transmission loss, the better the noise, vibration and harshness (NVH) characteristics of the hose. FIGS. 4 and 5 illustrate test results 50 for a hose in accordance with the present invention in comparison with various standard commercially available hose constructions. In each test, the hose in accordance with the present invention exhibited greatly superior dampening characteristics in the frequency range of about 300 to 400 Hz, which is the frequency range associated with "moan" of power steering systems.

FIG. 6 illustrates test results 50 of the hose in accordance with the present invention in comparison with commercially available hoses equipped with noise-suppression "tuners" of the type illustrated for example in U.S. Pat. No. 6,155,378. Once again, in the frequency range of about 300 to 400 Hz associated with objectionable "moan" noise in power steering systems, the hose in accordance with the present invention exhibited noise suppression properties superior to those of "tuned" hoses.

From the foregoing description it will be seen that high temperature and pressure power steering hose constructions have been in production for a number of years, and likewise that it is well known in the art to provide the capability to coextrude two different materials at the same time. The invention takes advantage of this prior knowledge in the art but improves upon it by employing two different materials and a selected ratio of respective laminate wall thicknesses in the innermost multilayer tube 12 of a multilaminate hose. Those two materials possess different degrees of noise dampening properties to help create the amount of noise dampening desired from the power steering hose and still maintain the high temperature fluid aging and fluid sealing properties required for prolonged service life of the hose in power steering automotive environments.

The invention claimed is:

1. A method of using a power steering fluid hose for dampening fluid-borne noise in automotive power steering system which comprises the steps of:
    (a) directing power steering fluid through a power steering fluid hose having a laminated inner tube surrounded by a reinforcing outer tube,
    (b) selecting the materials and radial thickness dimensions of said laminated inner tube to provide a resilient inner layer having good noise dampening properties with a radial thickness $T_1$ and a resilient outer layer with a radial thickness $T_2$ and having lesser noise dampening characteristics than said inner layer but capable of providing hoop strength reinforcement under adverse high temperature conditions,
    (c) selecting said inner layer material to have a softer durometer value than said outer layer
    (d) bonding said inner layer by vulcanization to said outer layer, and
    (e) selecting by empirical determination a ratio of said radial thicknesses $T_1$ and $T_2$ found to maximize dampening of fluid-borne noise in said system within a preselected frequency range by elastic radial expansion of said inner and outer layers.

2. The method set forth in claim 1 wherein said ratio is in the range of 30:70 to 70:30.

3. The method of claim 2 wherein said inner layer has a hardness in the range of 70 to 80 durometer, wherein said preselected frequency range is 300 to 400 Hz and wherein said inner layer of said inner tube is of ethylene/acrylic elastomeric material and said outer layer of said inner tube is of peroxide-vulcanized acrylonitrile-butadiene copolymer rubber.

4. The method set forth in claim 1 wherein said inner layer has a hardness in the range of 70 to 80 diameter durometer.

5. The method set forth in claim 1 wherein said preselected frequency range is 300 to 400 Hz.

6. The method set forth in claim 1 wherein said inner layer of said inner tube is of ethylene/acrylic elastomeric material, and said outer layer of said inner tube is of peroxide-vulcanized acrylonitrile-butadiene copolymer rubber.

7. A method of making a power steering pressure hose having a predetermined fluid-borne noise dampening characteristics, which comprises the steps of:
  (a) providing a laminated inner tube having an inner layer with a radial thickness $T_1$ and an outer layer with a radial thickness $T_2$, said inner layer having a hardness in the range of about 70 to 80 durometer, and said radial thickness $T_1$ having a ratio to said outer thickness $T_2$ in the range of about 30:70 to 70:30,
  (b) surrounding said inner tube with an outer reinforcing tube and
  (c) selecting by empirical determination a ratio of said radial thicknesses within said range to maximize dampening of fluid-borne noise by elastic radial expansion of said inner and outer layers.

* * * * *